UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRACENE DYES AND PROCESS OF MAKING SAME.

1,026,588.      Specification of Letters Patent.      Patented May 14, 1912.

No Drawing.      Application filed January 31, 1911. Serial No. 605,746.

*To all whom it may concern:*

Be it known that I, MAX HENRY ISLER, chemist, citizen of the Swiss Republic, residing at Mannheim, Germany, have invented new and useful Improvements in Anthracene Dyes and Processes of Making Same, of which the following is a specification.

I have discovered that by treating an amino-anthraquinone, or a derivative of an amino-anthraquinone, with trichlor-methyl-sulfur chlorid (perchlor-methyl-mercaptan, *cf. Berichte*, 20, 2377) I can obtain new compounds which are dianthraquinonyl-thiourea bodies which can either be used as coloring matters themselves for dyeing cotton or wool from a vat, or can be employed in the production of coloring matters. The reaction according to this invention is preferably carried out in the presence of a solvent or a suspension agent and, if desired, also in the presence of a substance exercising a catalytic action, such for example as copper or copper salts, and also, if desired, a body which is capable of fixing hydrochloric acid may be added.

The following is an example of how my invention can be carried into practical effect, but the invention is not limited to this example. The parts are by weight. Boil together, in a reflux apparatus, ten parts of 2-amino-anthraquinone, from fifty to one hundred parts of nitrobenzene, and four parts of trichlor-methyl-sulfur chlorid, until, by a test, it is seen that coloring matter is no longer being formed. The condensation product should then be filtered off, preferably while hot. It can be purified by re-crystallizing it from quinolin and then, from analysis, appears to possess a constitution corresponding to the formula

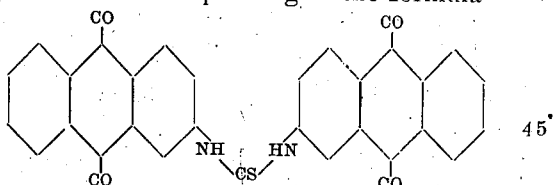

It dissolves in concentrated sulfuric acid, the solution being orange, but it is difficultly soluble in alcohol, benzene, nitrobenzene, and glacial acetic acid. It yields a reddish orange colored vat in alkaline hydrosulfite and this colors cotton brown-red shades, which become orange color upon washing and hanging in the air. Wool can be dyed in a similar manner.

In the foregoing example, the reaction can be carried on, if desired, at a considerably lower temperature, for instance at about one hundred and thirty degrees centigrade, but, in this case, a longer time is required for the completion of the reaction.

Instead of 2-amino-anthraquinone, a derivative thereof, or a diamino-anthraquinone, or a derivative thereof, can be employed and corresponding results be obtained. For example, the coloring matters obtained according to this invention from the following amino-anthraquinones will produce the following colors on cotton and wool:—2.6-diamino-anthraquinone, yellow; 2-amino-6-hydroxy-anthraquinone, brown;

2-amino-3-methyl-anthraquinone, orange;
2-amino-3-chlor-anthraquinone, yellow-olive.

Some of the properties of other coloring matters obtainable according to my invention are given in the following table—

| Dye from trichlor-methyl-sulfur chlorid and— | Appearance of powder. | Solution in— | | | Color of vat. | Shade on cotton. |
|---|---|---|---|---|---|---|
| | | Concentrated sulfuric acid. | Boiling nitrobenzene. | Boiling caustic soda. | | |
| 1.4-diamino-anthraquinone | Blue-black | Brown | Brown-violet | Insoluble | Dull red | Violet-gray. |
| Alpha-beta-diamino-anthraquinone | Brown-violet | Brown-olive | Yellowish brown | Insoluble | Yellowish red | Brown-red. |
| Para-diamino-anthrarufin | Lustrous blue-violet. | Brown | Red-violet | Blue | Brown | Blue-gray. |
| 2-amino-anthraquinone | Brick-red | Orange | Yellow | Insoluble | Reddish orange. | Orange. |
| 1-amino-anthraquinone | Dark gray | Olive | Yellowish brown | Insoluble | Brown-red | Brown. |
| 1.4-amino-hydroxy-anthraquinone | Blue-violet | Blue | Red | Blue | Red-brown | Gray-violet. |
| 1.5-diamino-anthraquinone | Brown | Yellowish brown | Yellowish brown | Insoluble | Yellowish red | Violet-brown. |

In the case of 1.4-diamino-anthraquinone, two molecular proportions thereof were allowed to react on two molecular proportions of trichlor-methyl-sulfur chlorid. In all the other cases, only one molecular proportion of the trichlor-methyl-sulfur chlorid was taken for two molecular proportions of the amino-anthraquinone or derivative. Of course the invention is not limited to the actual proportions here stated by way of example. The alpha-beta-diamino-anthraquinone mentioned in the foregoing table was prepared by reducing the mixture of 1.3-, 1.6-, and 1.7-dinitro-anthraquinone obtainable as a by-product when nitrating anthraquinone for the production of 1.5- and 1.8-dinitro-anthraquinone.

Now what I claim is:—

1. The process of producing coloring matters of the anthracene series by treating an amino-anthraquinone body with trichlor-methyl-sulfur chlorid.

2. The process of producing coloring matter of the anthracene series by treating 2-amino-anthraquinone with trichlor-methyl-sulfur chlorid.

3. As new articles of manufacture the coloring matters which can be obtained by treating an amino-anthraquinone body with trichlor-methyl-sulfur chlorid, which new coloring matters are dianthraquinonyl-thiourea bodies, contain sulfur and are insoluble in water, soluble in sulfuric acid and in nitrobenzene giving colored solutions, soluble in the hydrosulfite vat, dyeing both cotton and wool various shades.

4. As a new article of manufacture the coloring matter which can be obtained by treating 2-amino-anthraquinone with trichlor-methyl-sulfur chlorid, which coloring matter possesses a composition corresponding to the formula

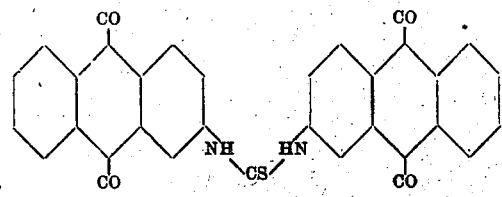

consists when dry of a brick-red powder, which yields an orange solution in concentrated sulfuric acid and a yellow solution in boiling nitrobenzene and which dyes cotton from the vat orange shades.

In testimony whereof I have hereunto set my hand in the presence of two subscribing witnesses.

MAX HENRY ISLER.

Witnesses:
J. ALEC. LLOYD,
A. O. TUTMANN.